United States Patent [19]
Goto et al.

[11] 3,927,655
[45] Dec. 23, 1975

[54] STRUCTURE OF THE COMBINATION CHAMBER OF INTERNAL COMBUSTION ENGINES

[75] Inventors: Kenji Goto; Takao Niwa, both of Susono, Japan

[73] Assignee: Toyota Jidosha Kogyo Kabushiki Kaisha, Japan

[22] Filed: Mar. 26, 1974

[21] Appl. No.: 454,930

[30] Foreign Application Priority Data
Oct. 8, 1973  Japan............................ 48-113039

[52] U.S. Cl.... 123/191 R; 123/193 H; 123/188 VA
[51] Int. Cl.² .......................................... F02B 23/00
[58] Field of Search ............ 123/30 C, 30 D, 32 ST, 123/65 WA, 191 R, 193 H, 193 CH, 188 VA, 191 C

[56] References Cited
UNITED STATES PATENTS

| | | | |
|---|---|---|---|
| 1,126,309 | 1/1915 | Snyder | 123/75 B |
| 1,812,262 | 6/1931 | Gardner et al. | 123/188 VA |
| 1,913,310 | 6/1933 | Moore | 123/191 R |
| 2,252,186 | 8/1941 | Kylen | 123/65 WA |
| 2,457,652 | 12/1948 | Fisher | 123/30.2 |
| 3,015,321 | 1/1962 | Stumpfig et al. | 123/30.21 |
| 3,496,923 | 2/1970 | Bashista | 123/191 R |

FOREIGN PATENTS OR APPLICATIONS

| | | | |
|---|---|---|---|
| 1,044,510 | 11/1958 | Germany | 123/188 VA |
| 403,077 | 4/1943 | Italy | 123/193 CH |
| 484,844 | 5/1938 | United Kingdom | 123/191 R |
| 789,753 | 11/1935 | France | 123/191 R |

*Primary Examiner*—Charles J. Myhre
*Assistant Examiner*—William C. Anderson
*Attorney, Agent, or Firm*—Stewart and Kolasch, Ltd.

[57] ABSTRACT

The structure of a combustion chamber of an internal combustion engine wherein a part of the inner wall of the cylinder head forming a peripheral portion of an intake port is extended to form a dam portion adapted to cooperate with the peripheral edge portion of a conventional intake poppet valve, when said valve is opened, to define an arcuate channel having a gradually increasing cross sectional area from one end toward the other end by said co-operation. Thus, a part of the intake fuel air mixture is introduced into said channel, diverted to flow along said channel and ejected at said other end as a jet flow to generate a large vortex flow in the combustion chamber to cover the entire region thereof, to accomplish good agitation of the mixture and accelerate the combustion rate of the mixture.

6 Claims, 2 Drawing Figures

STRUCTURE OF THE COMBINATION CHAMBER OF INTERNAL COMBUSTION ENGINES

BACKGROUND OF THE INVENTION

1. Field of the Invention

The present invention relates to the structure of a combustion chamber of an internal combustion engine, and more particularly, to the structure of a vortex generating combustion chamber.

2. Description of the Prior Art

With regard to internal combustion engines, it is known that an improvement of the fuel consumption and the purification of the exhaust gases by the reduction of harmful components such as HC, CO, NOx etc. included in the exhaust gases can be accomplished by increasing the air/fuel ratio, thereby enabling the internal combustion engines to operate with a lean fuel air mixture. In particular, it is very effective for reducing NOx included in the exhaust gases to increase the air/fuel ratio above 17–18. However, if the air/fuel ratio is increased too high, problems are produced such that the fuel-air mixture is hard to ignite and that since the combustion rate lowers, the ignition timing must be correspondingly advanced, which lowers the efficiency of the engine.

As a method to counteract the abovementioned problems encountered in the lean fuel-air mixture combustion, a stratified-charged combustion system has been proposed. The stratified-charge combustion system provides a relatively richer fuel air mixture in the vicinity of the spark gap of a spark plug even when a high air/fuel ratio is maintained as a whole. Thus, the richer fuel air mixture is first ignited and then mixed with other lean fuel air mixture during its combusting process. However, the stratified-charged combustion system contains the problem that at least two kinds of fuel-air mixtures of different air/fuel ratio must be produced.

As another method of trying to accomplish a better operation of an internal combustion engine with a lean fuel air mixture, it has been proposed to provide several spiral projections at the shoulder portion of a poppet intake valve so as to form the intake valve as a kind of shroud valve so that when the intake mixture flows into the cylinder by flowing over the shoulder portion of the poppet intake valve, it is deflected and given a revolving force by said spiral projections, thereby generating a vortex flow of the fuel air mixture in the combustion chamber and accelerating the combustion rate of the fuel-air mixture. However, such a shroud valve has drawbacks in that its mass is large, thereby causing deterioration of its durability as compared with an ordinary valve, and also, the charging efficiency is much lowered in high speed operation. Furthermore, since said spiral projections provided at the shoulder portion of the poppet intake valve must be arranged symmetrically about the axis of the valve because the valve rotates irregularly about its axis according to its popping operation, it is not necessarily ensured that the vortex flow of the intake mixture generated by the spiral projections provided symmetrically about the axis of the valve generates such a flow of the mixture in the combustion chamber that is proper to accelerate the combustion rate of the entire mixture contained in the combustion chamber. Thus, in some instances such a vortex flow would only result in a mere local agitation of the mixture.

SUMMARY OF THE INVENTION

Therefore, it is the object of the present invention to solve the abovementioned problems regarding lean fuel-air mixture combustion and to provide an improved structure of the combustion chamber of an internal combustion engine wherein a large and strong vortex flow of the fuel-air mixture which traverse the entire region of the combustion chamber is generated without employing a shroud valve, thereby accelerating the combustion rate of the mixture and accomplishing a good operation of the engine even with a lean fuel-air mixture.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by the structure of a combustion chamber of an internal combustion engine, a part of said combustion chamber being defined by a cylinder head provided with an intake port and an intake poppet valve which selectively opens or closes said intake port, wherein a part of the inner surface of the cylinder head forming a peripheral portion of the intake port is provided with a dam portion adapted to co-operate with a peripheral edge portion of said intake valve when said valve is in its open position so as to define an arcuate channel extending along said peripheral edge portion, said channel being adapted to have a gradually increasing cross sectional area from one end toward the other end thereof.

In the structure of the combustion chamber according to the present invention, when the intake valve is opened in the suction stroke, the peripheral edge portion of the intake valve positioned at its opening position co-operate with said dam portion formed at the peripheral portion of the inner surface of the cylinder head to define said arcuate channel, whereby the intake fuel air mixture supplied through the intake port is introduced into said channel. Since the channel is adapted to have a gradually increasing cross sectional area from one end toward the other end thereof, the fuel-air mixture introduced into said channel is diverted to flow toward said other end and finally ejected from said other end as a jet flow into the combustion chamber. By properly arranging the opening of said arcuate channel at said other end in the combustion chamber, a large vortex flow which turns in the entire region of the combustion chamber along its peripheral portion can be easily generated, whereby the fuel air mixture introduced into the combustion chamber can be formed into a large vortex flow turning over the entire region of the combustion chamber.

According to a particular feature of the present invention, it is proposed that the cylinder head is formed to provide the so-called bathtub type combustion chamber having a relatively shallow cavity formed in a part of said cylinder head, wherein said intake port opens at a bottom portion of said cavity and a wall portion of said channel is defined by a wall defining the peripheral portion of said cavity, and that a part of said wall defining the peripheral portion of said cavity is cut off to provide a relief portion defined by a surface smoothly joining the bottom wall of said cavity. According to this structure, the fuel air mixture ejected as a jet flow from said open end of said arcuate channel is guided along the peripheral wall of said cavity and thereby turned, and thereafter the mixture flows out smoothly from the cavity through said relief portion, whereby a continuing spiral vortex flow is generated in the combustion chamber.

To convert the jet flow ejected from said arcuate channel effectively into a vortex flow, said channel should preferably be opened to the combustion chamber at said end having the larger cross section and in a direction substantially tangent to the cylinder wall of the combustion chamber. On the other hand, it is preferable that said channel is substantially blocked at said end having the smaller cross section by a projection formed at a part of said dam.

In the case where said cavity is provided to form the bathtub type combustion chamber, it is preferable that said cavity provides a substantially C-shaped peripheral contour extending from said one end of said channel to an outer end of said relief portion. When said cavity is provided, an exhaust port may also open within said cavity. Furthermore, a spark gap of a spark plug should preferably be positioned within said cavity.

BRIEF DESCRIPTION OF THE DRAWING

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
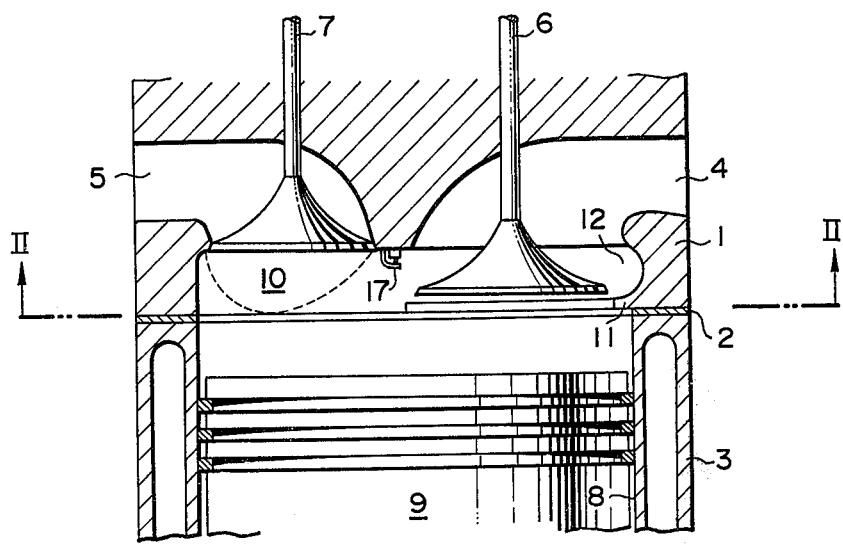
FIG. 1 is a longitudinal section of a cylinder head portion wherein the structure of the combustion chamber according to the present invention is applied to a bathtub combustion chamber, and, FIG. 2 is a botton view of the cylinder head portion along line II—II in FIG. 1.
Figure 2:
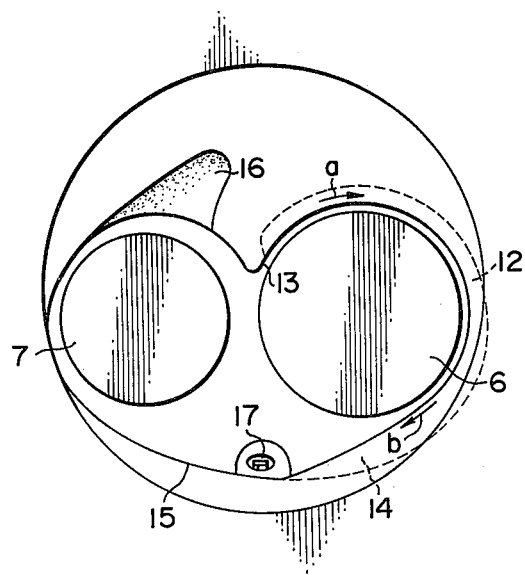

The present invention will now be described in more detail with reference to the accompanying drawings.

Referring to the drawings, reference numeral 1 designates a cylinder head which is mounted to a cylinder block 3 with the interposition of a gasket 2. The cylinder head is provided with an intake port 4 and an exhaust port 5 adapted to be selectively opened and closed by conventional poppet type intake valve 6 and exhaust valve 7. Element 8 is a cylinder formed in the cylinder block 3 and element 9 is a piston which reciprocates in said cylinder.

The cylinder head 1 is formed with a so-called bathtub type cavity 10 in its principal region including the intake and exhaust ports so that the intake port 4 as well as the exhaust port 5 open at the bottom wall of the cavity 10. A part of a peripheral portion of said cavity near the intake port 4 is extended to form an arcuate dam portion 11, said dam portion being adapted to cooperate with a peripheral edge portion of the intake valve positioned in its opening position to define an arcuate channel 12 extending along said peripheral edge portion. The arcuate channel is adapted to have a gradually increasing cross sectional area from its one end portion 13 toward the other end portion 14 and to be opened to the combustion chamber at said other end portion 14 where the wall of said channel is smoothly connected with a portion of a peripheral wall 15 defining the peripheral portion of the bathtub type cavity 10. A part of the peripheral wall 15 is cut off to form a relief portion 16 defined by a surface smoothly connecting to the bottom wall of the cavity 10. Element 17 is a spark plug.

In operation, when the intake valve 6 has been pushed down in the suction stroke, the intake port 4 is opened and as the piston lowers, the fuel-air mixture flows in through the intake port 4. The mixture is then deflected by the intake valve 6 to flow radially over the shoulder portion of the intake valve and a part of the mixture flows into the channel 12 and there it impinges against the peripheral wall 15 defining the channel and is deflected to flow in the direction shown by arrow a and finally ejected from the end portion 14 in the direction shown by arrow b. The fuel air mixture ejected in the direction of arrow b flows substantially along the peripheral wall 15 of the cavity 10 to turn therealong and finally flows out smoothly from the cavity along the relief portion 16. By such a revolutional flow of the mixture, a large vortex flow turning around a central portion of the combustion chamber in a manner to cover the entire region thereof is generated. The large vortex flow of the mixture is effectively maintained, up to the time when the suction stroke has been completed and the combustion of the mixture is initiated due to the operation of the spark plug 17 in the succeeding compression stroke. Thus a good agitation of the mixture is accomplished in the ignition and the combustion processes.

By employing the structure of the combustion chamber according to the present invention, the air/fuel ratio can be increased up to 22–23 or even up to 25 as a possible extreme. Sine in this case, the combustion rate is accelerated, the advance angle of the ignition timing can be reduced, whereby the efficiency of the engine can be improved and the fuel consumption can be reduced.

Although the present invention is particularly suited to be applied to the combustion chamber of the so-called bathtub type, it is to be understood that the application of the present invention is not limited to the bathtub type combustion chamber but this invention can be effectively applied to wedge type and other types of combustion chambers.

The invention being thus described, it will be obvious that the same may be varied in many ways. Such variations are not to be regarded as a departure from the spirit and scope of the invention, and all such modifications are intended to be included within the scope of the following claims.

We claim:

1. The structure of a combustion chamber of an internal combustion engine comprising a cylinder head provided with an intake port and an intake poppet valve which selectively opens or closes said intake port, wherein a part of the inner surface of the cylinder head forming a peripheral portion of the intake port is provided with a dam portion adapted to cooperate with the peripheral edge portion of said intake valve when said valve is in its open position so as to define an arcuate channel extending along said peripheral edge portion, said arcuate channel having a gradually increasing cross sectional area from one end toward the other end thereof.

2. The structure according to claim 1, wherein said arcuate channel opens to the combustion chamber at said other end thereof in a direction substantially tangential to the peripheral wall of the combustion chamber.

3. The structure according to claim 1, wherein said arcuate channel is substantially blocked at said one end thereof by a projection formed on a part of the inner surface of the cylinder head near the inlet to the intake port.

4. The structure according to claim 1, wherein the combustion chamber is also provided with an exhaust port, said intake port and said exhaust port opening at a bottom portion of a relatively shallow cavity formed in a part of said cylinder head, a wall portion of said arcuate channel being defined by a wall defining the peripheral portion of said cavity, a portion of said wall which defines the peripheral portion of said cavity being cut off to provide a relief portion defined by a surface smoothly joining the bottom wall of said cavity, and a spark plug positioned within said cavity.

5. The structure according to claim 4, wherein said cavity has a substantially C-shaped peripheral contour extending from said one end of said channel to said relief portion.

6. The structure of a combustion engine of an internal combustion engine which effectively utilizes an air/fuel ratio of about 22 to 25 thereby improving the efficiency of the engine and reducing the fuel consumption which comprises a cylinder head provided with an intake port having an intake valve which selectively opens and closes said intake port and an exhaust port having an exhaust valve wherein a part of the inner surface of the cylinder head forming a peripheral portion of the intake port is provided with a dam portion adapted to cooperate with the peripheral edge portion of said intake valve when said valve is in its open position so as to define an arcuate channel extending along said peripheral edge portion, said arcuate channel having a gradually increasing cross sectional area from one end toward the other end thereof and being substantially blocked at one end thereof by a projection formed on a part of the inner surface of the inner cylinder head near the inlet to the intake port, said arcuate channel opening to the combustion chamber at said other end thereof in a direction substantially tangential to the peripheral wall of the combustion chamber, and said exhaust port opening at a bottom portion of a relatively shallow cavity formed in a part of said cylinder head, a wall portion of said arcuate channel being defined by a wall defining the peripheral portion of said cavity, a portion of said wall which defines the peripheral portion of said cavity being cut off to provide a relief portion defined by a surface smoothly joining the bottom wall of said cavity, wherein said cavity has a substantially C-shape peripheral contour extending from one end of said channel to said relief portion, and a spark plug positioned within said cavity.

* * * * *